(12) United States Patent
Park (10) Patent No.: US 9,983,433 B2
(45) Date of Patent: May 29, 2018

(54) TRANSFLECTIVE LIQUID CRYSTAL DISPLAY PANEL COMPRISING A PHASE RETARDATION FILM BETWEEN AN OVER COATER AND A COMMON ELECTRODE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventor: Ku Hyun Park, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 241 days.

(21) Appl. No.: 14/348,762

(22) PCT Filed: Nov. 8, 2013

(86) PCT No.: PCT/CN2013/086755
§ 371 (c)(1),
(2) Date: Mar. 31, 2014

(87) PCT Pub. No.: WO2014/176886
PCT Pub. Date: Nov. 6, 2014

(65) Prior Publication Data
US 2016/0011460 A1    Jan. 14, 2016

(30) Foreign Application Priority Data

May 3, 2013    (CN) .......................... 2013 1 0160858

(51) Int. Cl.
*G02F 1/1335*    (2006.01)
*G02F 1/1343*    (2006.01)
(Continued)

(52) U.S. Cl.
CPC ........ *G02F 1/133555* (2013.01); *G02F 1/139* (2013.01); *G02F 1/13363* (2013.01);
(Continued)

(58) Field of Classification Search
CPC ........... G02F 1/133555; G02F 1/13439; G02F 1/133512; G02F 1/133514;
(Continued)

(56) References Cited

U.S. PATENT DOCUMENTS

2002/0113765 A1    8/2002 Moon et al.
2003/0071952 A1*   4/2003 Yoshida ............ G02F 1/134363
                                              349/141
(Continued)

FOREIGN PATENT DOCUMENTS

CN    1950745 A    4/2007
CN    1967849 A    5/2007
(Continued)

OTHER PUBLICATIONS

International Search Report dated Jan. 30, 2014; PCT/CN2013/086755.

(Continued)

*Primary Examiner* — Paul Lee
(74) *Attorney, Agent, or Firm* — Ladas & Parry LLP (57) ABSTRACT

A transflective liquid crystal display (LCD) panel, a display device and an array substrate are disclosed. The display panel includes a first substrate, a second substrate arranged opposite to the first substrate, and a liquid crystal layer disposed between the first substrate and the second substrate. The first substrate and the second substrate include a transmissive area and a reflective area, and the cell gaps of the transmissive area and the reflective area are unequal to each other. A portion of the first substrate corresponding to the reflective area is provided with a first over coater on a (Continued)

side surface close to the liquid crystal layer; a pixel electrode of an integrate structure is respectively disposed on a portion of the second substrate corresponding to the transmissive area and a portion of the second substrate corresponding to the reflective area; a portion of the second substrate corresponding to the transmissive area and on the pixel electrode is provided with a second common electrode with a slit structure, on a side surface close to the liquid crystal layer; and an insulating layer is disposed between the pixel electrode and the second common electrode. The transflective LCD panel can realize wide viewing angle and high contrast.

15 Claims, 5 Drawing Sheets (51) Int. Cl.
G02F 1/139 (2006.01)
G02F 1/13363 (2006.01)

(52) U.S. Cl.
CPC .... *G02F 1/13439* (2013.01); *G02F 1/133512* (2013.01); *G02F 1/133514* (2013.01); *G02F 1/133528* (2013.01); *G02F 1/134363* (2013.01); *G02F 1/1393* (2013.01); *G02F 1/1396* (2013.01); *G02F 2001/133531* (2013.01); *G02F 2001/133638* (2013.01)

(58) Field of Classification Search
CPC ........... G02F 1/133528; G02F 1/13363; G02F 1/139; G02F 2001/133531
See application file for complete search history.

(56) References Cited

U.S. PATENT DOCUMENTS

| | | | | |
|---|---|---|---|---|
| 2005/0140916 | A1* | 6/2005 | Kume | G02F 1/1393 349/156 |
| 2006/0268206 | A1* | 11/2006 | Nishimura | G02F 1/134363 349/114 |
| 2007/0002226 | A1 | 1/2007 | Sakamoto et al. | |
| 2007/0109472 | A1 | 5/2007 | Chuang et al. | |
| 2008/0036954 | A1 | 2/2008 | Takahashi et al. | |
| 2008/0068523 | A1* | 3/2008 | Mitsui | G02F 1/133555 349/37 |
| 2008/0068543 | A1* | 3/2008 | Mitsui | G02F 1/134309 349/114 |
| 2008/0094554 | A1* | 4/2008 | Sato | G02F 1/136213 349/114 |
| 2008/0100784 | A1* | 5/2008 | Haruyama | G02F 1/1395 349/114 |
| 2008/0297674 | A1* | 12/2008 | Sakamoto | G02F 1/133555 349/37 |
| 2009/0122211 | A1* | 5/2009 | Mori | G02F 1/133555 349/42 |
| 2009/0167998 | A1* | 7/2009 | Park | G02F 1/133555 349/114 |
| 2009/0237579 | A1* | 9/2009 | Shin | G02F 1/1343 349/38 |
| 2010/0110351 | A1* | 5/2010 | Kim | G02F 1/133555 349/114 |
| 2010/0208176 | A1 | 8/2010 | Ge et al. | |
| 2014/0139789 | A1 | 5/2014 | Guo et al. | |

FOREIGN PATENT DOCUMENTS

| | | |
|---|---|---|
| CN | 101149540 A | 3/2008 |
| CN | 101266347 A | 9/2008 |
| CN | 101329470 A | 12/2008 |
| CN | 101482667 A | 7/2009 |
| CN | 101833198 A | 9/2010 |
| CN | 102998849 A | 3/2013 |
| CN | 203191665 A | 9/2013 |
| JP | 0990353 A | 4/1997 |
| JP | 2007-219053 A | 8/2007 |
| JP | 2008-070688 A | 3/2008 |

OTHER PUBLICATIONS

Written Opinion of the International Searching Authority dated Jan. 30, 2014; PCT/CN2013/086755.
Second Chinese Office Action Appln. No. 201310160858.X; dated May 25, 2015.
First Chinese Office Action Appln. No. 201310160858.X; dated Feb. 10, 2015.
Chinese Search Report; Appln. No. 201310160858.X.

* cited by examiner

TRANSFLECTIVE LIQUID CRYSTAL DISPLAY PANEL COMPRISING A PHASE RETARDATION FILM BETWEEN AN OVER COATER AND A COMMON ELECTRODE

TECHNICAL FIELD

Embodiments of the present invention relate to a transflective liquid crystal display (LCD) panel, a display device and an array substrate.

BACKGROUND

With the advance of display technologies, transflective LCDs have been increasingly playing an important role in the market. Especially in the current era of highly developed communication industry, transflective LCDs can be applied to display screens of mobile phones or tablet PCs, so that users in darkrooms or very bright outdoor environments can clearly identify the content displayed in the screens.

Based on different structures, transflective LCD devices can be divided into two types: double cell gap type and single cell gap type. A transmissive portion (transmissive area) and a reflective portion (reflective area) of a transflective LCD of double cell gap type have different cell gaps, and the cell gap in the transmissive area is usually twice of the cell gap in the reflective area; but a transmissive area and a reflective area of a transflective LCD of single cell gap type have a same cell gap.

SUMMARY

One embodiment of the present invention provides a transflective LCD panel, which comprises: a first substrate, a second substrate arranged opposite to the first substrate, and a liquid crystal layer disposed between the first substrate and the second substrate, wherein the first substrate and the second substrate comprise a transmissive area and a reflective area, and cell gaps of the transmissive area and the reflective area are unequal to each other; a portion of the first substrate corresponding to the reflective area is provided with a first over coater (OC) on a side surface close to the liquid crystal layer; a pixel electrode is disposed on a portion of the second substrate corresponding to the transmissive area and a portion of the second substrate corresponding to the reflective area; a portion of the second substrate corresponding to the transmissive area and on the pixel electrode is provided with a second common electrode with a slit structure, on a side surface close to the liquid crystal layer; and an insulating layer is disposed between the pixel electrode and the second common electrode.

Another embodiment of the present invention provides a display device, which comprises the foregoing transflective LCD panel.

Still another embodiment of the present invention provides an array substrate, which is the second substrate in the transflective LCD panel.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
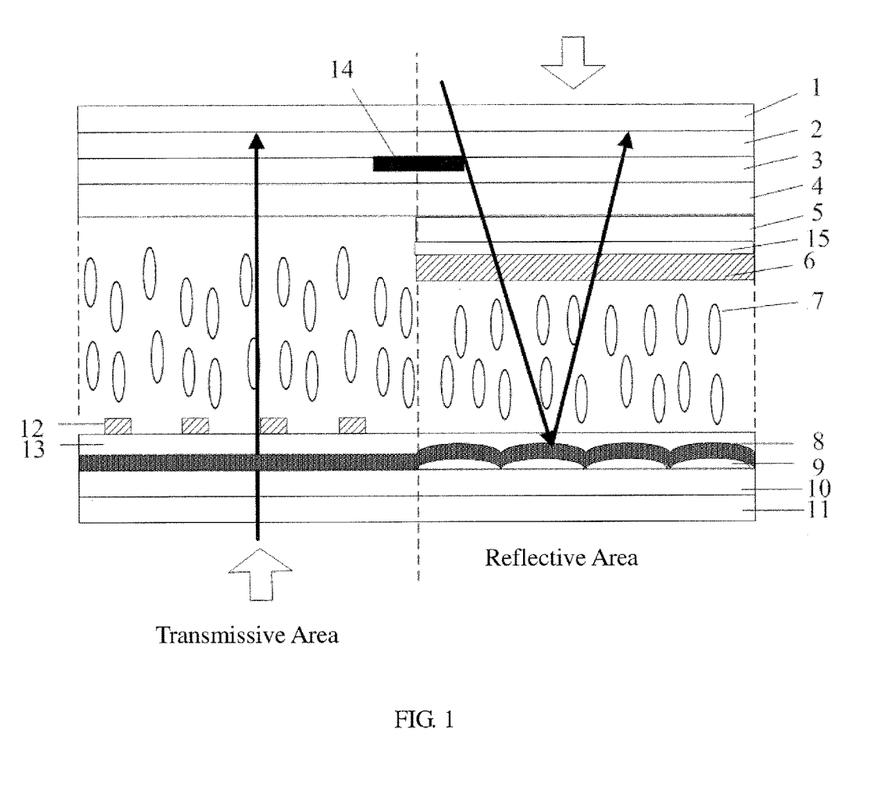
FIG. 1 is a schematic diagram of a transflective LCD panel provided by a first embodiment of the present invention under dark state.
Figure 2:
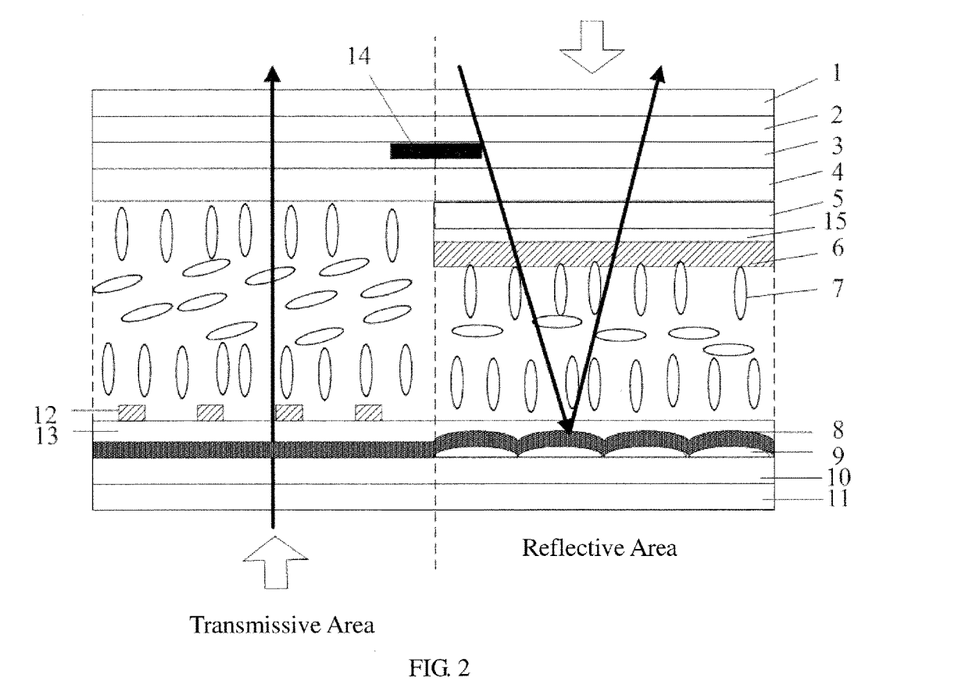
FIG. 2 is a schematic diagram of the transflective LCD panel provided by the first embodiment of the present invention under bright state.

As illustrated in FIGS. 1 and 2, a first embodiment of the present invention provides a transflective LCD panel, which comprises: a first substrate 2, a second substrate 10 arranged opposite to the first substrate 2, and a liquid crystal (LC) layer 7 disposed between the first substrate 2 and the second substrate 10. The first substrate 2 and the second substrate 10 comprise a transmissive area and a reflective area, and the cell gaps in the transmissive area and the reflective area are unequal to each other.

In the embodiment of the present invention, a portion of the first substrate 2 corresponding to the reflective area is provided with a first over coater (OC) 5 on a side surface close to the liquid crystal layer 7; a pixel electrode 8 is respectively disposed on a portion of the second substrate 10 corresponding to the transmissive area and a portion of the second substrate 10 corresponding to the reflective area; a portion of the second substrate 10 corresponding to the transmissive area and on the pixel electrode 8 is provided with a second common electrode 12 with a slit structure, on a side surface close to the liquid crystal layer 7; and an insulating layer 13 is disposed between the pixel electrode 8 and the second common electrode 12.

In the embodiment of the present invention, the pixel electrode 8 on the portion of the second substrate 10 corresponding to the transmissive area is planar.

Figure 3:
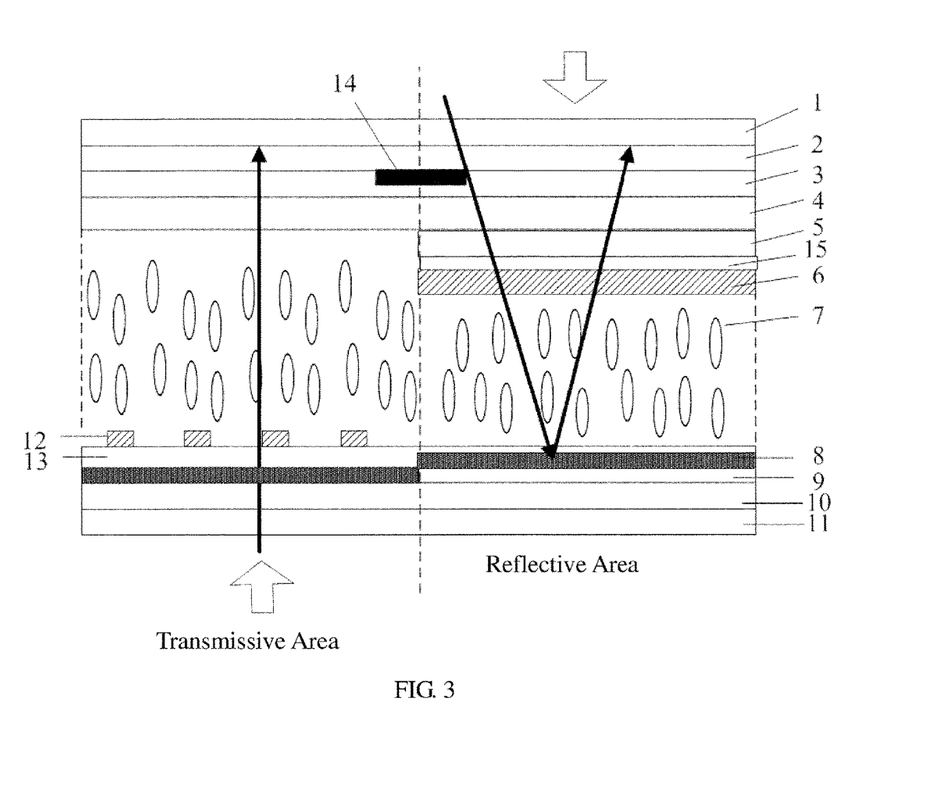
FIG. 3 is a schematic diagram of a transflective LCD panel provided by a second embodiment of the present invention under dark state.
Figure 4:
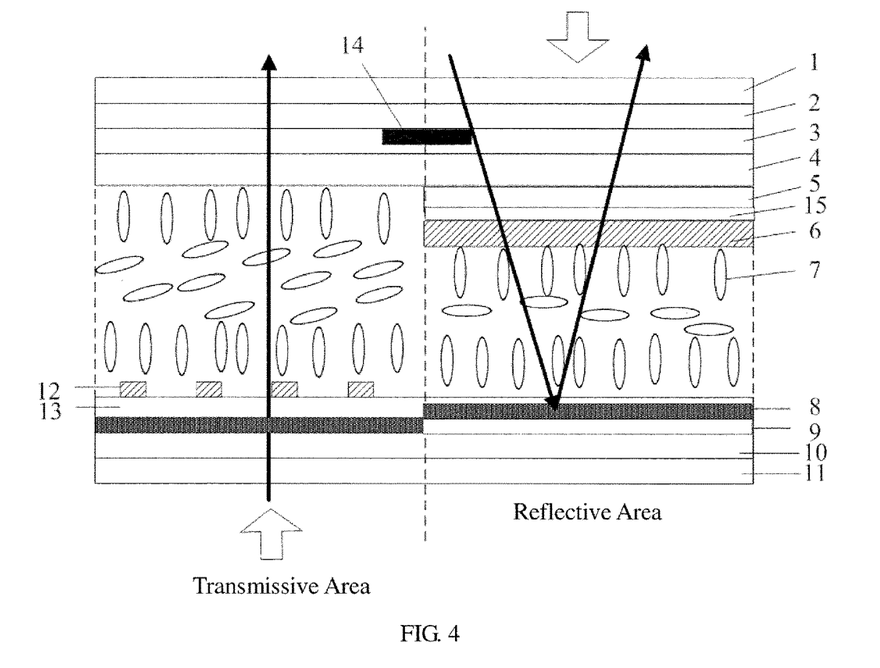
FIG. 4 is a schematic diagram of the transflective LCD panel provided by the second embodiment of the present invention under bright state.

In the embodiment of the present invention, a reflective layer 9 in a planar or embossed structure may be further disposed on the portion of the second substrate corresponding to the reflective area. In the embodiment, the reflective layer 9 may have an embossed structure as illustrated in FIGS. 1 and 2. However, the structure of the reflective layer 9 in the embodiment of the present invention is not limited thereto. For instance, the reflective layer 9 may be planar in the transflective LCD panel provided by the second embodiment of the present invention as illustrated in FIGS. 3 and 4.

For instance, the reflective layer 9 may be made of a metallic material having reflection characteristic and may be transparent or opaque. In this case, a wavy embossed structure may be prepared with a resin layer and hence a reflective metal layer may be directly formed on the embossed structure to form the reflective layer 9 with the embossed structure. Therefore, a better reflection effect can be achieved.

The pixel electrode 8 on the portion of the second substrate 10 corresponding to the reflective area may be planar or have an embossed structure conform with that of the reflective layer 9.

In some embodiments of the present invention, taking a transflective LCD panel with double cell gap as an example, the total thickness of the first OC 5 and the first common electrode 6 on the portion of the first substrate 2 corresponding to the reflective area is half of the cell gap. As illustrated in FIGS. 1 to 4, the cell gap is the thickness of the liquid crystal layer disposed between the second OC 4 and the insulating layer 13, and hence the thickness of the liquid crystal layer of the reflective area is half of the thickness of the liquid crystal layer of the transmissive area.

In the embodiment of the present invention, a first common electrode 6 is further disposed on a side surface of the first OC 5 close to the liquid crystal layer 7 and disposed on one side of the first substrate 2 corresponding to the whole reflective area, which is the nearest to the liquid crystal layer; and the first OC 5 is disposed on the first common electrode 6 and corresponds to the whole reflective area.

In the embodiment of the present invention, a light shielding layer 14 (e.g., black matrix (BM)) is disposed on the first substrate 2 corresponding to the transitional area between the transmissive area and the reflective area. Therefore, a BM light shielding layer may be disposed in the transitional area between the transmissive area and the reflective area to shield stray light from penetrating through the first substrate 2, and hence the phenomenon of light leakage can be avoided and the contrast can be improved. For instance, the width of the light shielding layer 14 is ranged from 7 to 21 micrometers, preferably 14 micrometers.

In the embodiment of the present invention, the first substrate 2 is provided with a color filter layer 3 corresponding to the whole transmissive area and the whole reflective area and covering the light shielding layer. Moreover, the color filter layer 3 may also be directly formed on the second substrate 10, for instance, formed on the pixel electrode 8 of the second substrate 10 or formed on the insulating layer 13.

The first substrate 2 is provided with a second OC 4 corresponding to the whole transmissive area and the whole reflective area and covering the color filter layer 3; and the first OC 5 is disposed on a side surface of the second OC close to the liquid crystal layer 7, namely the first OC 5 is disposed between the second OC 4 and the first common electrode 6. As the second OC 5 and the first common electrode 6 are only disposed in the reflective area and the thickness of the second OC 5 and the first common electrode 6 is half of the cell gap, and the total optical length of light reflected by the reflective area is equal to the total optical length of light penetrating through the transmissive area.

In the embodiment of the present invention, for instance, the first OC 5 and the second OC 4 may be made of a resin material. A first polarizer 1 is further disposed on an upper surface of the first substrate 2 away from the liquid crystal layer 7; a second polarizer 11 is further disposed on a side surface of the second substrate 10 away from the liquid crystal layer 7 or on a side surface of the second substrate 10 close to a backlight; and optical axes of the first polarizer 1 and the second polarizer 11 are perpendicular to each other. For instance, the first polarizer is a zero-degree polarizer and the second polarizer is a 90-degree polarizer; or the first polarizer is a 90-degree polarizer and the second polarizer is a zero-degree polarizer.

Moreover, in the embodiment of the present invention, a portion of the first polarizer 1 corresponding to the reflective area may also be provided with a $\lambda/4$ phase retardation film 15 on a side surface facing the liquid crystal layer 7. However, the position of the $\lambda/4$ phase retardation film 15 is not limited thereto. The $\lambda/4$ phase retardation film 15 may be disposed on any layer between the liquid crystal layer 7 and the first polarizer 1, for instance, may be disposed between the first substrate 2 and the first polarizer 1, between the first substrate 2 and the color filter layer 3, between the color filter layer 3 and the second OC 4, between the first OC 5 and the second OC 4, or between the first OC 5 and the first common electrode 6 (as illustrated in FIGS. 1 to 4, the embodiment of the present invention is obviously not limited to the situations as illustrated in the figures). Of course, the $\lambda/4$ phase retardation film 15 may also be disposed on a side surface of the first common electrode 6 facing the liquid crystal layer 7.

In the embodiment of the present invention, liquid crystal of the liquid crystal layer 7 may be negative liquid crystals, and the initial alignment of the negative liquid crystals is vertical alignment. In order to make the initial alignment of the negative liquid crystals to be vertical alignment, an alignment layer (polyimide (PI) layer) may be further covered on the second common electrode 12 of the second substrate 10, corresponding to the whole transmissive area and the whole reflective area. Of course, the portion of the second OC 4 of the first substrate 2, corresponding to the transmissive area, may also be covered with an alignment layer (PI layer) on the side surface close to the liquid crystal layer, so that the initial alignment of the liquid crystals can be vertical alignment when the liquid crystals are not applied with an electrical field, and hence the dark-state display can be achieved. Moreover, by adoption of the alignment layer in which the alignment of the liquid crystals is vertical alignment when the liquid crystals are not applied with an electrical field, the rubbing process can be saved.

Figure 5:
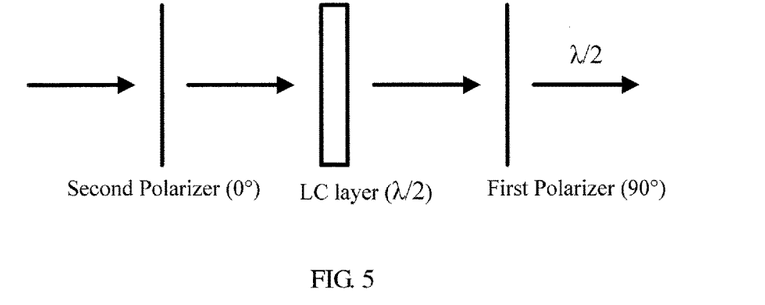
FIG. 5 is a schematic diagram illustrating the direction of light achieving bright-state display in a transmissive portion of the transflective LCD panel provided by the embodiment of the present invention.
Figure 6:
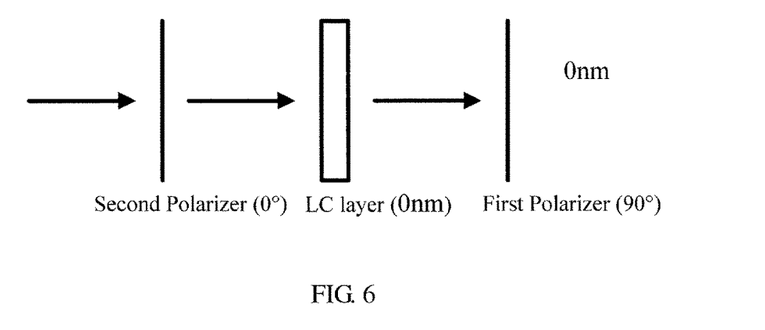
FIG. 6 is a schematic diagram illustrating the direction of light achieving dark-state display in the transmissive portion of the transflective LCD panel provided by the embodiment of the present invention.
Figure 7:
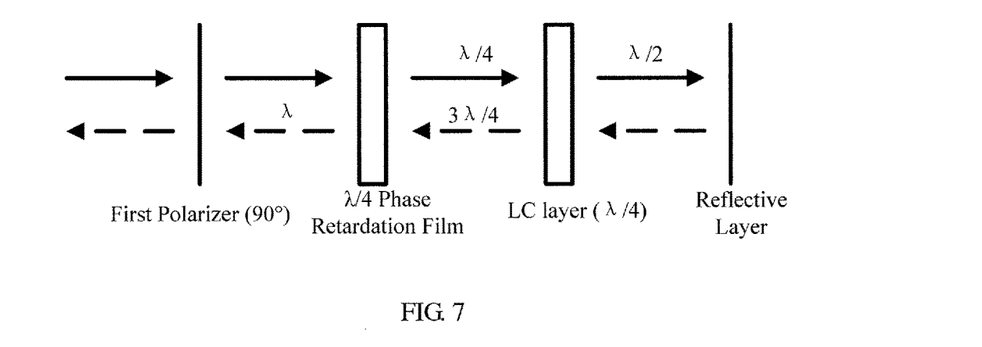
FIG. 7 is a schematic diagram illustrating the direction of light achieving bright-state display in a reflective portion of the transflective LCD panel provided by the embodiment of the present invention.
Figure 8:
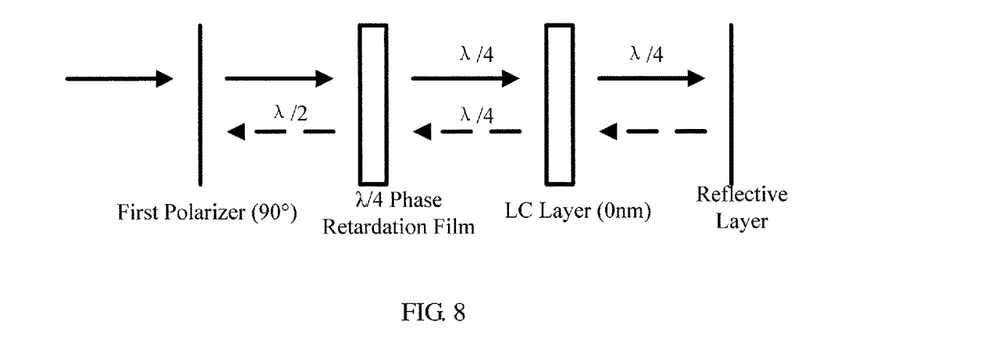
FIG. 8 is a schematic diagram illustrating the direction of light achieving dark-state display in the reflective portion of the transflective LCD panel provided by the embodiment of the present invention

The principles of the transflective LCD panel provided in the embodiment of the present invention for achieving transflective display will be described below with reference to FIGS. 1 to 8.

Where no voltage is applied across the liquid crystal layer 7, as illustrated in FIGS. 1, 3, 6 and 8, in the transmissive area (as illustrated in FIG. 6), after emitted from the backlight, light passes through the second polarizer 11 (e.g., the zero-degree polarizer) at first and is converted to linearly polarized light (it should be noted that: when light passes through a polarizer, only light parallel to a transmission axis of the polarizer can run through the polarizer, and hence light emitted by a backlight similar to ambient light can be converted to linearly polarized light parallel to the transmission axis of the polarizer after running through a zero-degree polarizer); subsequently, the linearly polarized light passes through the liquid crystal layer 7, and the vibration direction of the linearly polarized light is changed because the initial alignment of the liquid crystals of the liquid crystal layer 7 is vertical alignment and the optical retardation is $\lambda/2$ ($\lambda$ refers to half wavelength) thereof; the linearly polarized light passing through the liquid crystal layer 7 enters the first polarizer 1 (e.g., a 90-degree polarizer), and as the transmission axes of the first polarizer 1 and the second polarizer 11 are usually perpendicular to each other, the vibration direction of the linearly polarized light is also perpendicular to the transmission axis of the first polarizer 1, and hence the linearly polarized light cannot pass through the first polarizer 1; and at this point, the dark state of the transmissive area can be achieved.

Where no voltage is applied across the liquid crystal layer 7, in the reflective area (as illustrated in FIG. 8), ambient light passes through the first polarizer 1 (e.g., a 90-degree polarizer) to generate linearly polarized light parallel to the transmission axis of the first polarizer 1; the linearly polarized light passes through a $\lambda/4$ phase retardation film 15 to produce left-handed or right-handed circularly polarized light; the left-handed or right-handed circularly polarized light passes through the liquid crystal layer 7, and because liquid crystal molecules in the liquid crystal layer 7 are not affected by electric fields and have no retardation affect on the left-handed or right-handed circularly polarized light, the left-handed or right-handed circularly polarized light enters the reflective layer 9 as it; the left-handed or right-handed circularly polarized light is reflected by the reflective layer 9 to produce 2l2 retardation and is converted to right-handed or left-handed circularly polarized light accordingly; the right-handed or left-handed circularly polarized light enters the liquid crystal layer 7 again, is not retarded and runs through the $\lambda/4$ phase retardation film 15 again, is converted to linearly polarized light perpendicular to the transmission axis of the first polarizer 1, and hence cannot be emitted out from the first polarizer 1; and at this point, the dark state of the reflective area can be achieved.

Where a voltage is applied across the liquid crystal layer 7, as illustrated in FIGS. 2, 4, 5 and 7, in the transmissive area (as illustrated in FIG. 5), the liquid crystal molecules in the liquid crystal layer 7 will be deflected due to the action of the multidimensional electric fields in the plane between the second common electrode 12 in the transmissive area and the pixel electrode 8, and the vibration direction of linearly polarized light will be deflected. At this point, after emitted from the backlight, light passes through the second polarizer 11 (e.g., zero-degree polarizer) at first and is converted to linearly polarized light parallel to the transmission axis of the second polarizer 11; subsequently, the linearly polarized light passes through the liquid crystal layer 7 and is converted to left-handed or right-handed circularly polarized light; and the left-handed or right-handed circularly polarized light passing through the liquid crystal layer 7 enters the first polarizer 1 (e.g., a 90-degree polarizer), and because the vibration direction of the left-handed or right-handed circularly polarized light is not perpendicular to the transmission axis of the first polarizer 1, the left-handed or right-handed circularly polarized light can pass through the first polarizer 1, and hence images at different gray scales can be displayed. The transmissive area is actually of a pixel structure in an advanced super dimension switch (ADS) mode, namely a multidimensional electric field is produced by electric fields generated at edges of slit electrodes in the same plane and electric fields generated between slit electrode layers and plate electrode layers, so that liquid crystal molecules in all the alignments between slit electrodes in a liquid crystal cell and over electrodes can be all rotated, and hence the working efficiency of the liquid crystals and the light transmittance can be improved. Due to the ADS in the embodiment, the image quality of thin-film transistor liquid crystal display (TFT-LCD) products can be improved and the TF-LCD products can have the advantages of high resolution, high transmittance, low power consumption, wide viewing angle, high aperture opening ratio, low chromatic aberration, non push Mura and the like.

Where a voltage is applied across the liquid crystal layer 7, in the reflective area (as illustrated in FIG. 7), ambient light passes through the first polarizer 1 (e.g., 90-degree polarizer) to produce linearly polarized light of which the polarization direction is parallel to the transmission axis of the first polarizer 1; subsequently, the linearly polarized light passes through the $\lambda/4$ phase retardation film 15 to produce left-handed or right-handed circularly polarized light; the left-handed or right-handed circularly polarized light passes through the liquid crystal layer 7 and is converted to linearly polarized light of which the polarization direction is perpendicular to the transmission axis of the first polarizer 1 due to the $\lambda/4$ phase retardation caused by the liquid crystal layer; the linearly polarized light passes through the reflective layer 9 again and is still the linearly polarized light of which the polarization direction is perpendicular to the transmission axis of the first polarizer 1 due to the $\lambda/2$ phase retardation caused by the reflective layer 9; the light enters the liquid crystal layer 7 again and is converted to right-handed or left-handed circularly polarized light after $\lambda/4$ phase retardation; subsequently, the right-handed or left-handed circularly polarized light passes through the $\lambda/4$ phase retardation film 15 and is converted to linearly polarized light of which the polarization direction is parallel to the transmission axis of the first polarizer, and hence can be emitted out from the first polarizer 1; and at this point, the bright state of the reflective area can be achieved. The reflective area is actually of a pixel structure in a vertical alignment mode, namely in the reflective area, the liquid crystals in the liquid crystal layer 7 will be deflected due to the action of the vertical electric field between the pixel electrode 8 on the second substrate 10 and the first common electrode 6 on the first substrate 2, in the reflective area; and the linearly polarized light can also pass through the first polarizer 1 because the vibration direction of the linearly polarized light does not become perpendicular to the transmission axis of the first polarizer 1 after passing through the liquid crystal layer 7 twice, and hence images at different gray scales can be displayed.

The above example provided in the embodiment of the present invention adopts the ADS or IPS mode pixel structure in the transmissive area and the VA or TN mode pixel structure in the reflective area to achieve the object that the transmissive area and the reflective area of the transflective LCD device can display the dark state or bright state at the same time, and hence the transmissive portion of the transflective LCD device is guaranteed to have the advantage of wide viewing angle and the reflective portion of the transflective LCD device is guaranteed to have the advantage of high contrast. Moreover, the embodiment of the present invention further provides a multi-mode LCD device with wide viewing angle and high contrast.

The embodiment of the present invention further provides a display device comprising the transflective LCD panel.

Moreover, as illustrated in FIGS. 1 to 4, the embodiment of the present invention further provides an array substrate. The array substrate is the second substrate 10 of the transflective LCD device as illustrated in FIGS. 1 to 4. More specifically, a pixel electrode 8 is disposed on a portion of the second substrate 10 corresponding to the transmissive area and a portion of the second substrate 10 corresponding to the reflective area; a portion of the second substrate 10 corresponding to the transmissive area and on the pixel electrode 8 is provided with a second common electrode 12 of a slit structure, on a side surface close to the liquid crystal layer; and an insulating layer 13 is disposed between the pixel electrode 8 and the second common electrode 12.

In the embodiment of the present invention, the pixel electrode on the portion of the second substrate 10 corresponding to the transmissive area is planar.

In the embodiment of the present invention, a reflective layer 9 in a planar or embossed structure is disposed on a portion of the second substrate 10 corresponding to the reflective area. For instance, the planar reflective 9 is as illustrated in FIGS. 3 and 4, and the reflective layer 9 with the embossed structure is as illustrated in FIGS. 1 and 2.

In the embodiment of the present invention, the pixel electrode 8 on the portion of the second substrate corresponding to the reflective area may be planar or have an embossed structure conform with that of the reflective layer 9.

For instance, the reflective layer 9 may be made of a metallic material having reflection characteristic and may be transparent or opaque. In this case, a wavy embossed structure may be prepared with a resin layer and hence a reflective metal layer is directly formed on the embossed structure to form the reflective layer 9 of the embossed structure. Therefore, better reflection effect can be achieved.

In the embodiment of the present invention, a color filter layer may further be provided on the pixel electrode 8 or the insulating layer 13 on the second substrate 10. In this case, the first substrate 2 may be not provided with the color filter layer.

The array substrate provided by the embodiment of the present invention may be applied to the transflective LCD device, and hence the object that the transmissive area and the reflective area of the transflective LCD device display the dark state or the bright state at the same time can be achieved, and consequently the transmissive portion of the transflective LCD device is guaranteed to have the advantage of wide viewing angle and the reflective portion of the transflective LCD device is guaranteed to have the advantage of high contrast.

The foregoing embodiments are only illustrative of the technical proposals of the present invention and not intended to limit the present invention. Although detailed description has been given to the present invention with reference to the embodiments, it should be understood by those skilled in the art that: modification may be still made to the technical proposals of the embodiments and equivalent replacement may be still made to partial technical characteristics therein, by those skilled in the art; and the modifications or replacements should not allow the essence of corresponding technical proposals to depart from the spirit and scope of the technical proposals of the embodiments of the present invention.

The invention claimed is:

1. A transflective liquid crystal display (LCD) panel, comprising: a first substrate, a second substrate arranged opposite to the first substrate, and a liquid crystal layer disposed between the first substrate and the second substrate, wherein the first substrate and the second substrate comprise a transmissive area and a reflective area, and cell gaps of the transmissive area and the reflective area are unequal to each other;

a portion of the first substrate corresponding to the reflective area is provided with a first over coater (OC) on a side surface close to the liquid crystal layer;

a pixel electrode is disposed on a portion of the second substrate corresponding to the transmissive area and a portion of the second substrate corresponding to the reflective area; and a portion of the second substrate corresponding to the transmissive area and on the pixel electrode is provided with a second common electrode with a slit structure, on a side surface close to the liquid crystal layer; and an insulating layer is disposed between the pixel electrode and the second common electrode;

wherein a first common electrode is disposed on a side surface of the first OC close to the liquid crystal layer, and wherein a $\lambda/4$ phase retardation film is provided between the first over coater and the first common electrode;

wherein a total thickness of the first OC and the first common electrode on the first substrate is half of the cell gap of the transmissive area.

2. The transflective LCD panel according to claim 1, wherein the pixel electrode on the portion of the second substrate corresponding to the transmissive area is planar.

3. The transflective LCD panel according to claim 1, wherein the pixel electrode on the portion of the second substrate corresponding to the reflective area is planar or has an embossed structure conform with that of the reflecting layer.

4. The transflective LCD panel according to claim 1, wherein a light shielding layer is disposed on the first substrate corresponding to a transitional area between the transmissive area and the reflective area.

5. The transflective LCD panel according to claim 4, wherein the first substrate is provided with a color filter layer corresponding to the whole transmissive area and the whole reflective area and covering the light shielding layer.

6. The transflective LCD panel according to claim 5, wherein the first substrate is provided with a second OC corresponding to the whole transmissive area and the whole reflective area and covering the color filter layer; and the first OC is disposed on a side surface of the second OC facing the liquid crystal layer.

7. The transflective LCD panel according to claim 6, wherein the first OC and the second OC are made of resin materials.

8. The transflective LCD panel according to claim 1, wherein liquid crystals of the liquid crystal layer are negative liquid crystals.

9. A display device, comprising the transflective LCD panel according to claim 1.

10. An array substrate, the array substrate being the second substrate according to claim 1.

11. The transflective LCD panel according to claim 1 wherein the first common electrode is only disposed in the reflective area.

12. The transflective LCD panel according to claim 1, wherein a first polarizer is disposed on a side surface of the first substrate away from the liquid crystal layer; and a second polarizer is disposed on a side surface of the second substrate away from the liquid crystal layer.

13. The transflective LCD panel according to claim 12, wherein transmission axes of the first polarizer and the second polarizer are perpendicular to each other.

14. The transflective LCD panel according to claim 13, wherein a portion of the first polarizer corresponding to the reflective area is provided with a λ/4 phase retardation film on a side surface facing the liquid crystal layer.

15. The transflective LCD panel according to claim 11, wherein a reflecting layer in a planar or embossed structure is disposed on the portion of the second substrate corresponding to the reflective area; and is disposed between the second substrate and the pixel electrode of the reflective area.

* * * * *